United States Patent [19]
Teruuchi

[11] Patent Number: 5,708,786
[45] Date of Patent: Jan. 13, 1998

[54] DATA PROCESSING DEVICE HAVING EVENT IN NON-WINDOWS DESKTOP ENVIRONMENT AFFECTING WINDOW IN DESKTOP ENVIRONMENT

[75] Inventor: Tomoru Teruuchi, Kawasaki, Japan

[73] Assignee: Fuji Xerox, Co., Ltd., Tokyo, Japan

[21] Appl. No.: 386,870

[22] Filed: Feb. 10, 1995

[30] Foreign Application Priority Data

Feb. 15, 1994 [JP] Japan ............................. 6-040547

[51] Int. Cl.$^6$ ........................................... G06F 15/00
[52] U.S. Cl. ........................ 395/340; 395/326; 395/335
[58] Field of Search .......................... 395/155, 157, 395/158, 159, 160, 161, 118, 340, 339, 326, 333, 335

[56] References Cited

U.S. PATENT DOCUMENTS

| 5,091,866 | 2/1992 | Takagi .................... 395/158 |
| 5,119,080 | 6/1992 | Kajimoto et al. ............ 340/723 |
| 5,280,583 | 1/1994 | Nakayama et al. .......... 395/200 |
| 5,359,344 | 10/1994 | Inoue et al. ................ 395/100 |
| 5,434,968 | 7/1995 | Kunii et al. ................ 395/163 |
| 5,467,441 | 11/1995 | Stone et al. ................ 395/133 |
| 5,502,808 | 3/1996 | Goddard et al. ............ 395/162 |
| 5,530,797 | 6/1996 | Uya et al. .................. 395/164 |

FOREIGN PATENT DOCUMENTS 4-170585  6/1992  Japan .

Primary Examiner—Raymond J. Bayerl
Assistant Examiner—Steven P. Sax
Attorney, Agent, or Firm—Oliff & Berridge

[57] ABSTRACT

A data processing device making a plurality of desktops which can be used without switching and simultaneously is disclosed, comprising: a first processing portion which manages windows generated on a screen, as a processing portion managing an operation environment; a second processing portion which manages the screen other than the windows, as a processing portion managing operation environments; an event managing portion which determines whether an event caused by an operation applied to the screen is for a first operation environment or a second operation environment, and the second processing portion including means for outputting to the first processing portion a request for generating a window of the second operation environment as processing of the event which is determined to be for the second operation environment by the event managing portion, and the first processing portion including means for generating and controlling a window of the first operation environment as processing of the event which is determined to be for the first operation environment by the event managing portion and means for generating a window of the second operation environment in accordance with a request for generating a window of the second operation environment from the second processing means.

3 Claims, 13 Drawing Sheets

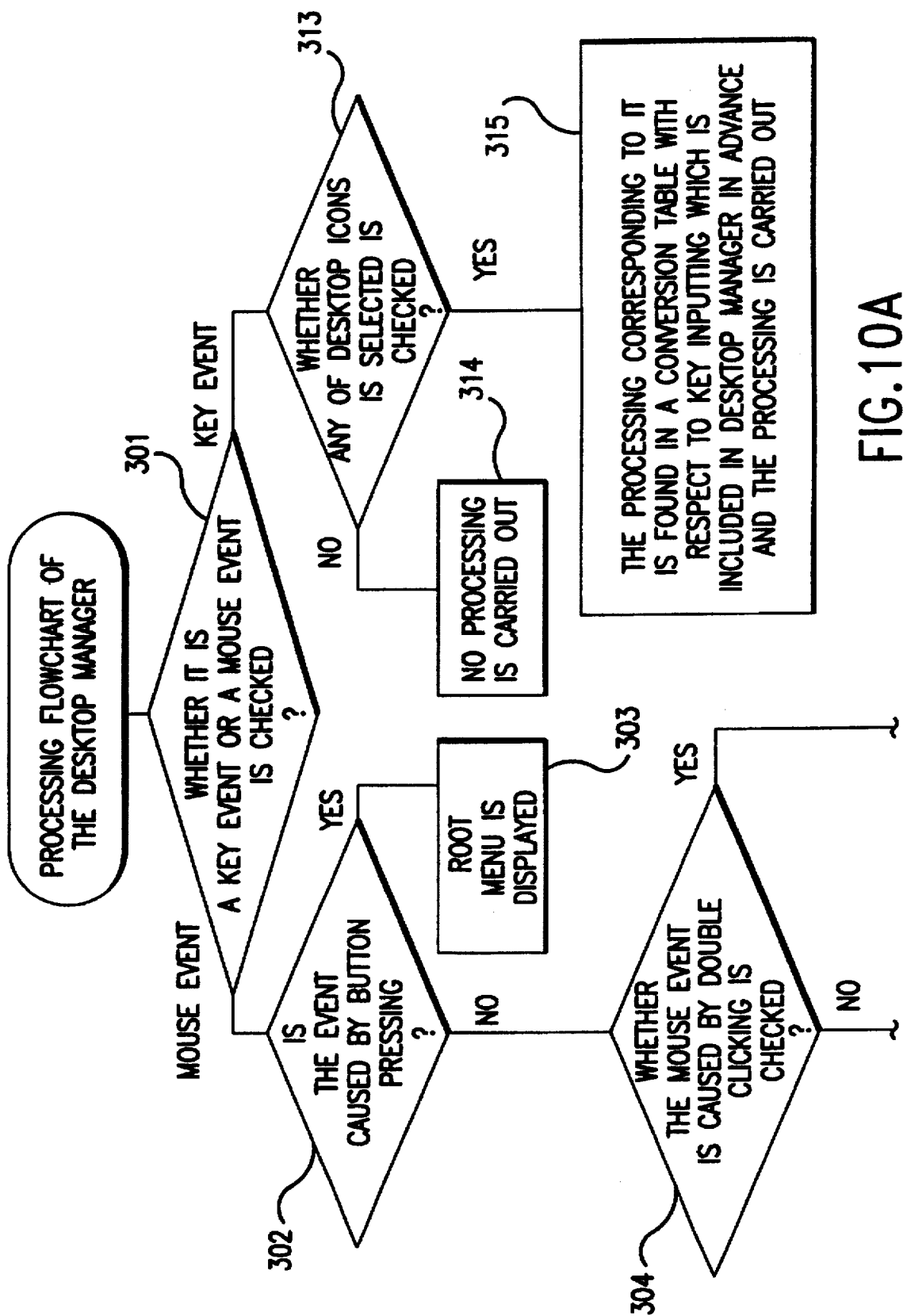

DATA PROCESSING DEVICE HAVING EVENT IN NON-WINDOWS DESKTOP ENVIRONMENT AFFECTING WINDOW IN DESKTOP ENVIRONMENT

FIELD OF THE INVENTION

The present invention relates to a data processing device having multi-window functions wherein a plurality of windows are displayed on a screen and processing is carried out in each of them.

BACKGROUND OF THE INVENTION

Conventionally, in data processing devices having multi-window functions such as workstations or personal computers, pictures showing the concept of items such as a sheet, a folder, a drawer or a mail box which are used in general offices are provided on screens so that operators can handle the devices easily and the operability of the operators are improved, and operation environments using such pictures are realized. Here, such pictures and an operation environment model using the pictures are referred to as icons and a desktop respectively. With a data processing device having multi-window functions, the types of desktops being used are determined in accordance with the behaviors of icons and windows.

Generally, a window in a desktop is generated when some operations, such as selecting an icon corresponding to it by a mouse and applying double clicks to it, are applied to a corresponding icon and an operation of a user made on the desktop is informed as an event.

Although, in conventional data processing devices, one or a plurality of screens have a desktop generally, there are arts wherein a screen has a plurality of desktops. As described above, the types of desktops being used are determined in accordance with the behaviors of icons and windows, if desktops wherein icons and the corresponding windows are operated individually icon by icon are provided on a screen, it is regarded that a plurality of desktops are realized.

For example, Japanese unexamined patent publication number Hei 4-170585 describes a switching controlling method of multi-window system, using:

an event controlling portion having at least two event buffers and capable of switching among the event buffers;

displaying controlling portion having at least one window and capable of displaying and non-displaying of windows, and wherein a plurality of desktops are realized by switching an event buffer to another event buffer and switching a window to another window, in accordance with a multi-window switching request.

Methods wherein a plurality of desktops are realized by providing a closed desktop in another desktop are also known. FIG. 11 is a schematic view showing this system, and FIG. 12 shows the structure of a plurality of desktops provided on a screen.

In FIG. 12, W1, W2 and W11 are windows displayed on screen 12 of display 11, and processing can be carried out in each window. The window, W11 cannot be generated without the existence of W1, and it is generated within W1.

Icons IW1, IW2, IW3 and IW4 are provided on the screen of display 11, and they are the icons managed as windows (Hereinafter, they are referred to as window icons.)

Besides, icons ID1, ID2 and so on are provided within window W1, and they are the icons not managed as windows (Hereinafter, they are referred to as desktop icons.) The area RW of screen 12 of display 11 other than the windows (including window icons) is particularly referred to as a root window.

In this case, window icons IW1 and IW2 correspond to windows W1 and W2 respectively and windows W1 and W2 are made to open by events caused by indicating, for example by doubly clicking, window icons IW1 and IW2 by means of a mouse. Although windows W1 and W2 on the screen disappear when events causing the windows W1 and W2 to close occur, the window icons IW1 and IW2 remain there.

It is a first desktop that comprises window icons such as IW1 and IW2 and windows such as W1 and W2, that is, as shown in FIG. 11, first desktop managing portion 1 making the first desktop manages windows W1 and W2, window icons IW1, IW2, IW3 and IW4 and root window RW.

Each window generated within window W1 has a corresponding desktop icon such as ID1, ID2 or the like provided within window W1. For example, in FIG. 12, desktop icon ID3 corresponds to window W11, and window W11 is made to open by an event caused by doubly clicking icon ID3. Although window W11 generated within window W1 disappears when an event causing window W11 to close occur, icon ID3 remains within window W1.

It is a second desktop which comprises desktop icons such as ID1 and ID2 and windows such as W11, that is, as shown in FIG. 11, second desktop managing portion 2 manages desktop icons such as ID1 and ID2 and windows such as W11. As shown in FIG. 11, as desktop icons such as ID1 and ID2 are provided within window W1 and windows such as W11 are also generated in window W1, second desktop managing portion 2 is under the control of window W1, that is, it is managed by first desktop managing portion 1 which manages window W1.

With switching controlling method of multi-window system described in the above described application, a plurality of desktops cannot be used simultaneously, and the method is not suitable for high speed processing because of overhead caused when switching, and further, as switching event is necessary when switching, extra processing tends to be caused. With this conventional method, in a case of the above described example, the second desktop cannot be used without the existence of the window W1.

In the conventional example shown in FIGS. 11 and 12, there are also problems of overhead caused by extra processing wherein processing by second desktop managing portion is carried out through window W1.

SUMMARY OF THE INVENTION

It is an object of the present invention to provide a data processing device free of the defects found in the conventional arts.

It is another object of the present invention to provide a data processing device capable of making a plurality of desktops on a screen.

Additional objects and advantages of the invention will be set forth in part in the description which follows and in part will be apparent from the description, or may be learned by practice of the invention.

The structure of the data processing device according to the present invention to solve the above described problems is now described, using the same reference indications as used in the embodiments described later.

The data processing device having multi-window functions wherein a plurality of windows are displayed on a screen and processing is carried out in each of them, comprises:

a first processing portion (31) which manages windows generated on a screen as a processing portion managing operation environments;

a second processing portion (32) which manages an area of the screen other than the windows; and event managing portion (312) which determines whether an event caused by an operation applied to the screen is for a first operation environment or a second operation environment, in accordance with whether the operation is applied with respect to one of said windows or a portion of the screen other than windows, and the second processing portion includes window generating request outputting means (322) which outputs to the first processing menus a request for generating a window of the second operation environment for event processing when an event is determined to be for the second operation environment by the event managing portion, and the first processing portion includes window controlling means (311) which not only generates and controls a window of the first operation environment for event processing when an event is determined to be for the first operation environment by the event managing portion but also generates a window of the second operation environment in accordance with a request for generating a window of the second operation environment from the second processing portion.

When an event occurs in accordance with an operation of a user, if the operation is applied with respect to a window on the screen, the event managing portion determines that the event is for the first operation environment, and if the operation is applied with respect to a portion of the screen other than windows, it determines that the event is for the second operation environment.

If icons are displayed symbolizing that windows are closed, such icons are treated as windows and managed (such icons will be referred to as window icons later.) If icons type are displayed symbolizing that windows are colsed in the second operation environment, such icons are treated as the screen other than windows and managed (Such icons will be referred to as desktop icons later.)

If an event is determined to be for the first operation environment by the event managing portion, the processing with respect to the event is carried out by the window controlling portion of the first processing portion, and generating and controlling of a window of the first operation environment is done.

If an event is determined to be for the second operation environment and for requesting generating a window of the second operation environment by the event managing portion, a request of generating a window of the second operation environment is outputted from the window generating request outputting portion of the second processing portion to the first processing portion. Receiving a request of generating a window of the second operation environment, the window controlling portion of the first processing portion generates a window of the second operation environment, which can be distinguished from windows of the first operation environment.

Thus, windows of the first operation environment and those of the second operation environment wherein processing is carried out individually are generated on a screen, that is, a plurality of operation environments are made on a screen simultaneously without switching desktops. Therefore, there are no problems concerning overhead caused when switching and other extra processing is not caused, neither.

BRIEF DESCRIPTION OF THE DRAWINGS

The manner by which the above objects and the other objects, features and advantages of the present invention are attained will be fully evident from the following detailed description when it is considered in light of the accompanying drawings, wherein:

FIG. 10A-B show a flowchart of event processing steps of the embodiment shown in FIG. 1.

DETAILED DESCRIPTION OF THE INVENTION

Embodiment 1

A first embodiment of the data processing device according to the present invention is now described, referring to FIGS. 1 to 10.

Figure 2:
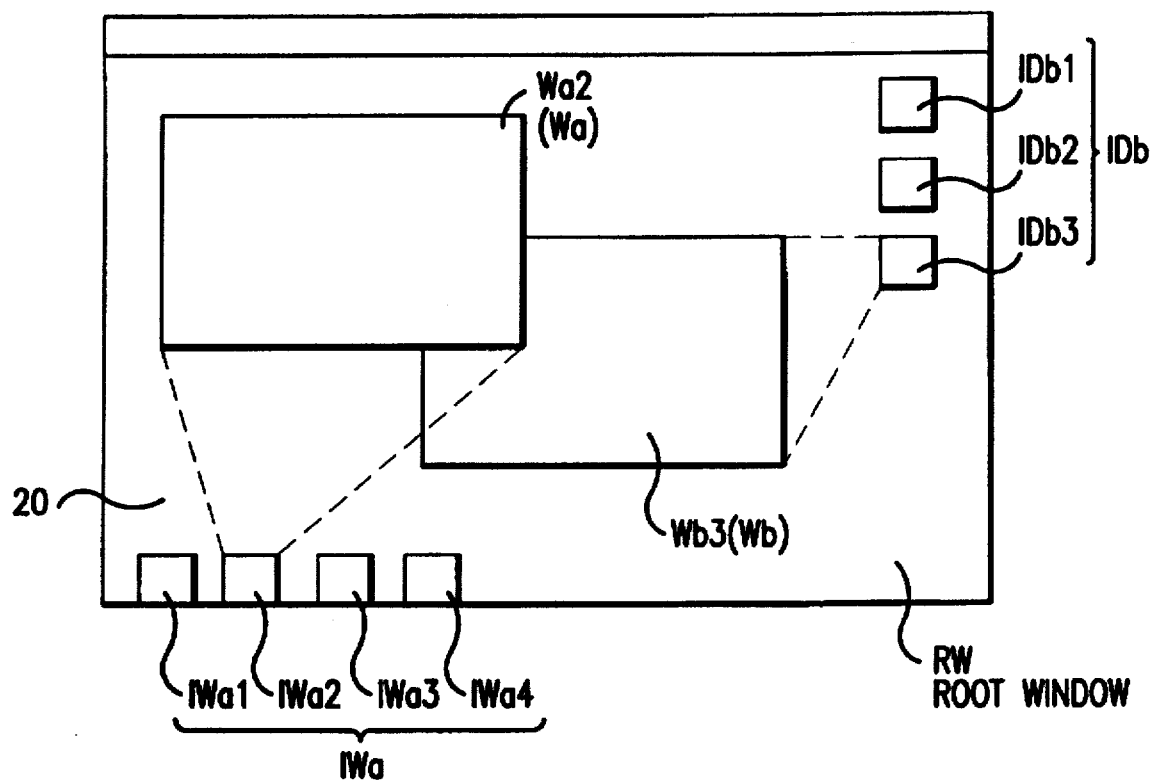
FIG. 2 shows an example of a screen used in the first embodiment of the data processing device according to the present invention.

Prior to describing the structure of the data processing device used in the first embodiment, the concept of the data processing device according to the present invention is described, referring to FIG. 2. FIG. 2 shows a displaying example of display 20 of the data processing device according to this embodiment which has multi-window functions, and display 20 is connected to a computer realizing multi-window functions.

On the screen of display 20, window Wa and the corresponding icon IWa of the first desktop and window Wb and the corresponding icon IDb of the second desktop are displayed. Here, window Wa and the corresponding icon IWa represent a plurality of windows of the first desktop and a plurality of icons of the first desktop respectively. Further, window Wb and the corresponding icon IDb represent a plurality of windows of the second desktop and a plurality of icons of the second desktop respectively.

In this embodiment, icons of the first desktop, IWa1, IWa2, IWa3, IWa4 and so on which are represented by icon IWa, are managed as windows, that is, they are window icons. In FIG. 2, window icon IWa2 corresponds to window Wa2, and for example, window Wa2 is generated by indicating window icon IWa2 by a mouse and applying double clicks to it.

Icons of the second desktop, IDb1, IDb2, IDb3 and so on which are represented by icon IDb, are displayed in root window RW as icons not managed as windows, that is, they are desktop icons. In FIG. 2, desktop icon IDb3 corresponds to window Wb3, and window Wb3 is generated, for example, by indicating desktop icon IDb3 and applying double clicks to it.

As described above, with a data processing device having multi-window functions, it is possible to display a plurality of windows on a screen, and generally, each processing is carried out in a corresponding window individually.

In the data processing device according to the present invention, the first desktop and the second desktop are managed by two processes, that is, window managing process (Hereinafter, this process is referred to as window manager) and root window managing process (Hereinafter, this process is referred to as desktop manager.)

Window manager which manages windows also controls window icons, and its functions include controlling the behaviors of the window icons. Therefore, it can manage the first desktop.

As described later, generating and managing of window Wb of the second desktop is carried out by the window manager, and desktop icon IDb is managed by the desktop manager which manages root window RW. That is, the second desktop is managed by the window manager and the desktop manager.

In the embodiment, as described later, information of an event corresponding to an operation of a user with respect to desktop icon IDb is received by the desktop manager finally, and if the operation is the above described double clicks requesting generating of a window, the desktop manager adds an desktop identifier to a window generating request and sends the window generating request with the desktop identifier to the window manager. When the window manager receives the request, it can generate a window of the predetermined desktop, that is, here, a window of the second desktop.

The desktop manager is capable of managing a plurality of groups of desktop icons, and a plurality of desktops can be made by providing an individual desktop identifier to each of the desktops.

As described above, a plurality of desktops can be made in a screen by managing desktops by two processes (the window manager and the desktop manager) and controlling by the above described two processes icons which are classified into two types (window icons and desktop icons) type by type.

Figure 1:
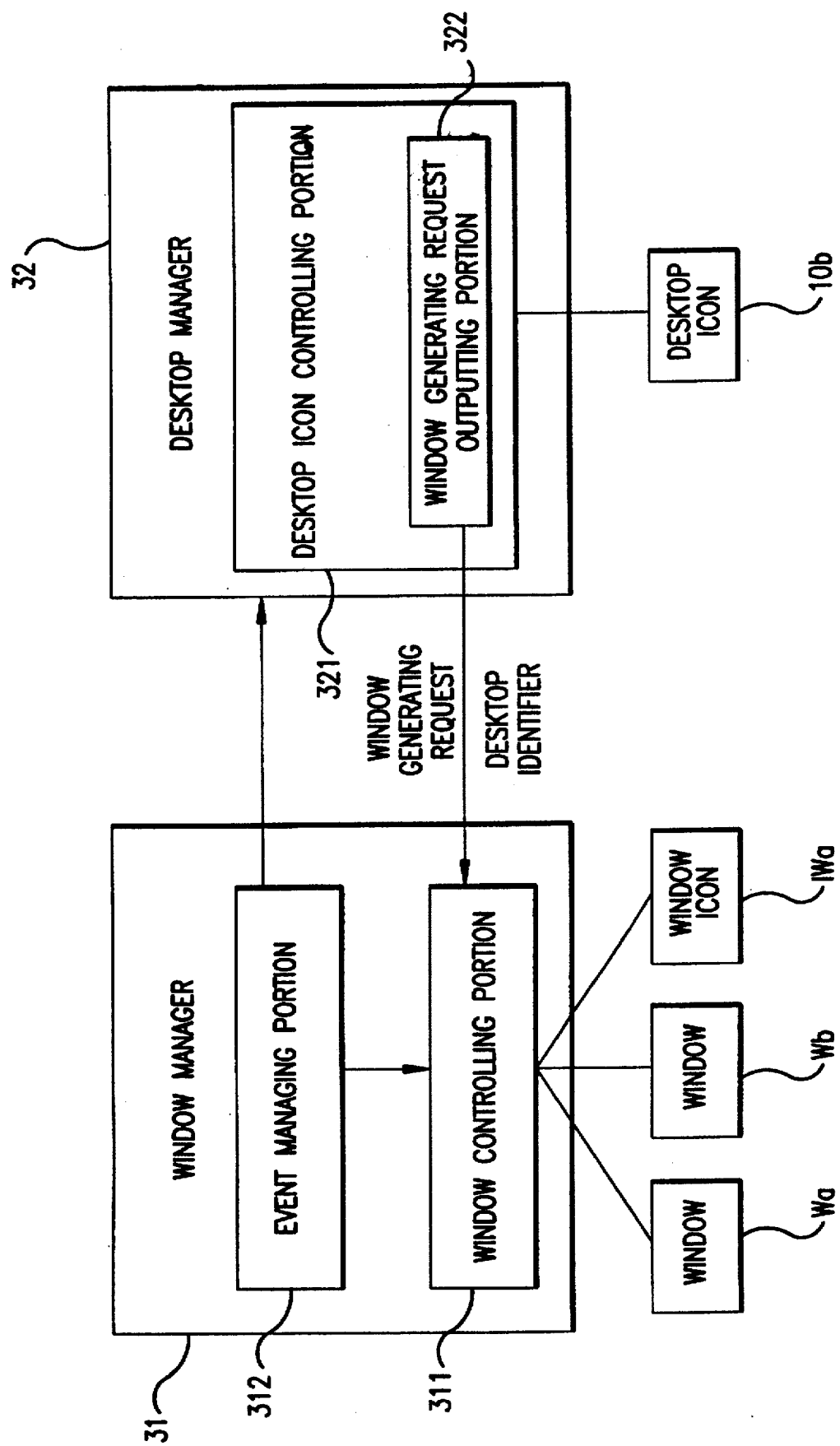
FIG. 1 is a schematic view showing the structure and functions of the data processing device used in a first embodiment according to the present invention.
Figure 3:
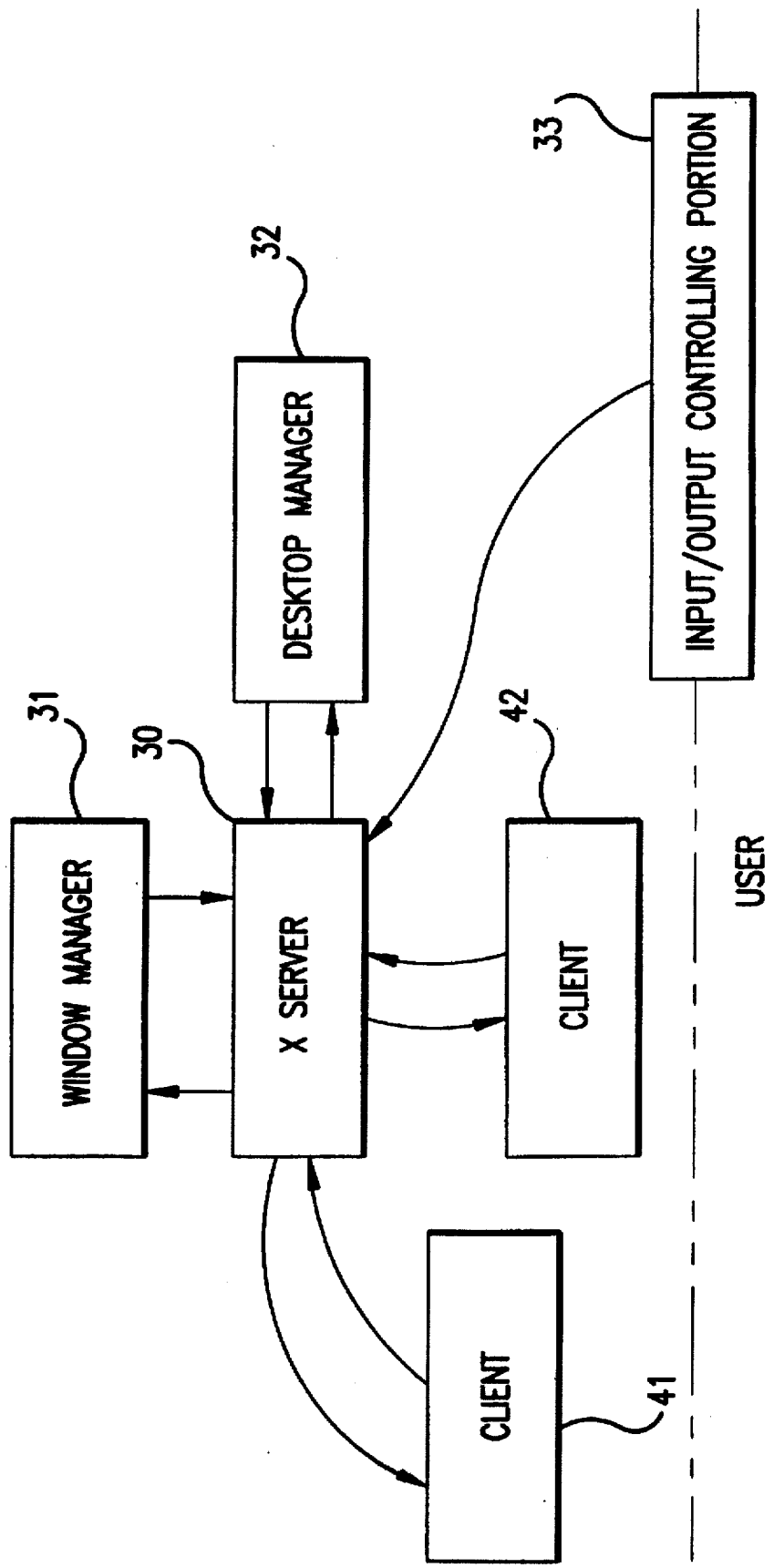
FIG. 3 is a schematic view showing the structure and functions of the data processing device used in the first embodiment according to the present invention.

FIG. 1 is a schematic view showing the structure and functions of the desktop managing portion of the data processing device used in the first embodiment wherein the above described two desktops are made on a screen, and FIG. 3 shows a schematic view wherein the desktop managing portion of FIG. 1 is realized by using X window system (X window is developed and licensed by X Consosium).

In FIG. 1, desktop managing portion comprises window manager 31 and desktop manager 32, and window manager 31 comprises window controlling portion 311 which controls every window on the screen (including window icons) functionally and event managing portion 312.

Window controlling portion 311 controls, as described later, carries out generating, controlling and managing of window Wa of the first desktop and generating and managing of window Wb of the second desktop.

An operation of a user applied to a desktop is informed as an event, and particularly, mouse events (events caused by mouse operating of users) and key events (events caused by keyboard operating of users) are used as events corresponding to operations of users with respect to desktops.

Event managing portion 312 determines whether an operation of a user informed as an event is for the first desktop or for the second desktop.

In this embodiment, whether an event caused by an operation of a user is for the first operation environment, that is, the first desktop or for the second operation environment, that is, the second desktop is determined in accordance with whether the operation is informed through root window RW or another window.

In FIG. 3, each of window manager 31 and desktop manager 32 is equivalent to a client with respect to X server 30 which is the core of X window system. In this embodiment, a window manager of OpenWindows (open windows is developed and licensed by Sun Microsystems, Inc.) is used as window manager 31, and a desktop manager of EDMICS; Engineering Drawing Management and Information Control Systems (EDMICS is developed and licensed by FUJI XEROX CO., LTD.) is used as desktop manager 32, and they communicate through X server 30. Clients 41 and 42 are applications corresponding to window Wa and window Wb respectively.

The desktop managed by window manager 31 is the first desktop, and in this embodiment, it is the desktop of OpenWindows. The desktop managed by desktop manager 32 and window manager 31 is the second desktop, and here, it is the desktop of EDMICS.

Strictly speaking, X server 30 also acts a part of the functions of window manager 31, but for the convenience of describing, here, this part is regarded to be included in the functions of window manager 31.

As shown in FIG. 3, in X window system, an operation of a user using a mouse or a keyboard to the desktop is sent to X server 30 as an event through input/output controlling portion 40. X server 30 informs window manager 31 of this event, and window manager 31 determines, in event managing portion 31 included in it, which desktop the event is for.

As only desktop icon IDb exists in root window RW, event managing portion 312 generally regards an operation applied to a window of the screen other than root window RW as an event for the first desktop and an operation to the root window RW as an event for the second desktop. An exception is that, if a key event is caused with root window RW selected, and if it is one of the key events memorized to be for the first desktop in the first desktop, it is necessary to predetermine that event managing portion 312 regards it as an event for the first desktop. Further, it is necessary to predetermine when starting this device that these particular key events are processed by window manager 31 side, that is, they are grabbed to window manager 31 side.

It is necessary to predetermine that an event is processed by window manager 31 if event managing portion 312 determines that the event is for the first desktop, and an event is to be transferred to desktop manager 32 through X server 30 if the event managing portion 312 determines that the event is for the second desktop. In this embodiment, the event determined to be for the second desktop and transferred to desktop manager 312 is generally caused by an operation applied to desktop icon IDb.

Desktop manager 32 comprises desktop icon controlling portion 321, and it carries out processing of events transferred from window manager 31. Further, desktop icon controlling portion 321 comprises window generating request outputting portion 322.

If an event transferred from window manager 31 to desktop manager 32 is a window opening event, that is, an event requesting generating of a window of the second desktop, window generating request outputting portion 322 adds to a window generating request a desktop identifier showing that it is a window of the second desktop that is to be generated and it outputs the window generating request with the desktop identifier to window manager 31 through X server 30. By the desktop identifier, it is indicated to window manager 31 which desktop the window to be generated belongs to.

Receiving a window generating request from desktop manager 32, X server 30 carries out a processing program for generating a window and outputs an event of map requesting (an event requesting window visualizing). Receiving this map requesting event, window manager 31 knows in advance that a window generating request will be sent from X server 30, and after receiving this request, it generates window Wb of the second desktop in accordance with this request. X server 30, for managing a window, makes a window identifier showing which window of the second desktop is to be generated and sends it to window manager 31.

Window controlling portion 311 of window manager 31 then carries out generating of widow Wb of the second desktop. Window controlling portion 311 also carries out generating and controlling of window icon IWa and window Wa of the first desktop as a matter of course. Desktop identifiers are also provided to windows of the first desktop.

As described above, window controlling portion 311 carries out generating and controlling window Wa and window icon IWa of the first desktop and window Wb of the second desktop, and it makes them behave as requested.

Behavior of each window is determined in accordance with appearance or functions of its frame which is different desktop by desktop. Window controlling portion 311 makes an individual frame for each window of the first and second desktops in accordance with its desktop identifier.

For example, a button icon is displayed in the frame of window Wa of the first desktop, and if a button icon of "menu" is selected, menus for controlling window Wa, such as "close", are displayed. As for a window of the second desktop, a menu item "close" displayed by a button icon does not exist, and processing of "close" is carried out by a button operation of the core window surrounded by the frame.

Figure 4:
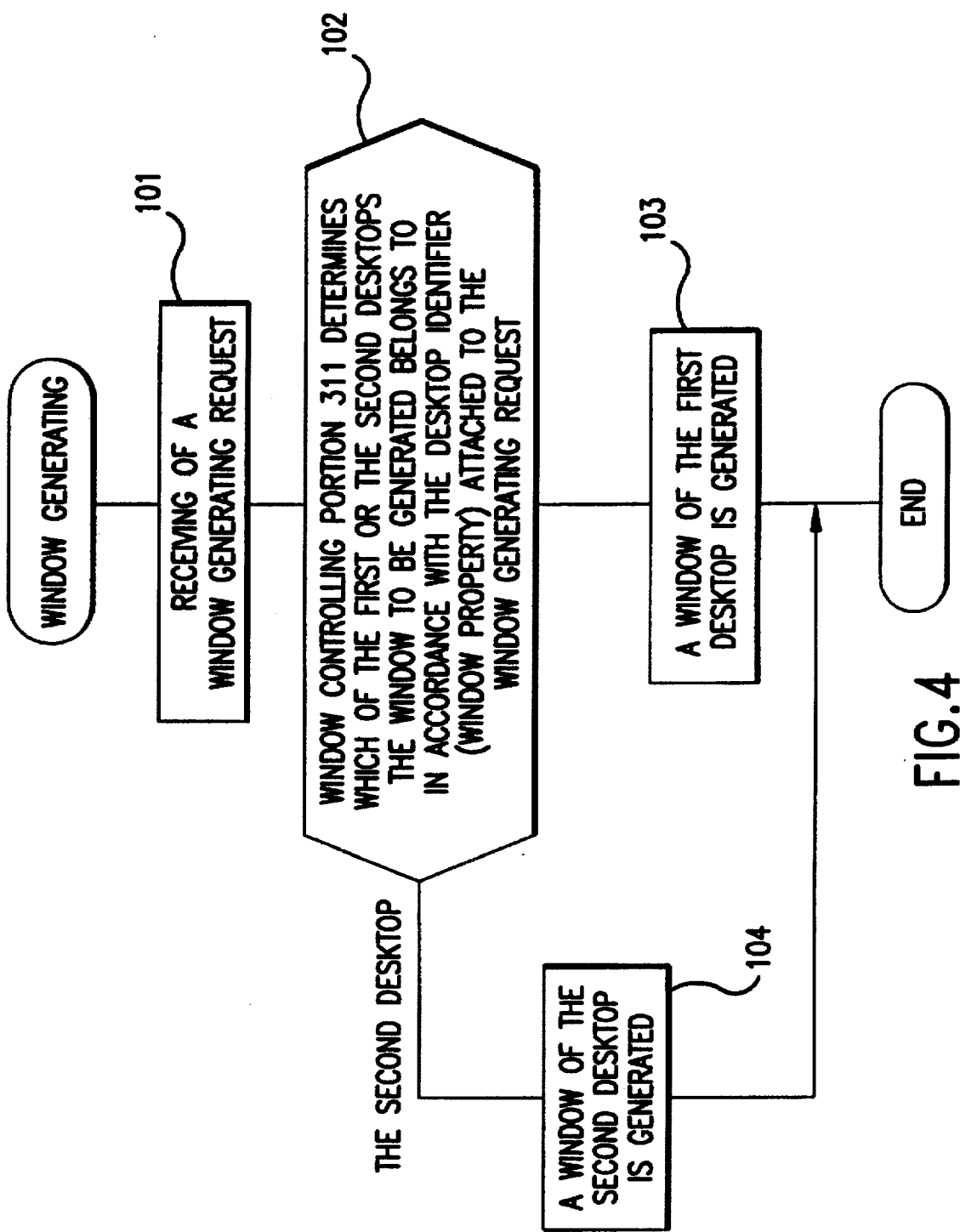
FIG. 4 is a flowchart of the principal processing steps of the embodiment shown in FIG. 1.

FIG. 4 shows processing steps of window generating carried out by window controlling portion 311. Receiving a window generating request (step 101), window controlling portion 311 determines which of the first or the second desktops the window to be generated belongs to in accordance with the desktop identifier (window property) attached to the window generating request (step 102). If it is a request with respect to a window of the first desktop, a window of the first desktop is generated (step 103), and if it is a request with respect to a window of the second desktop, a window of the second desktop is generated (step 104). Here, window generating is carried out by making a frame of the window.

Figure 5:
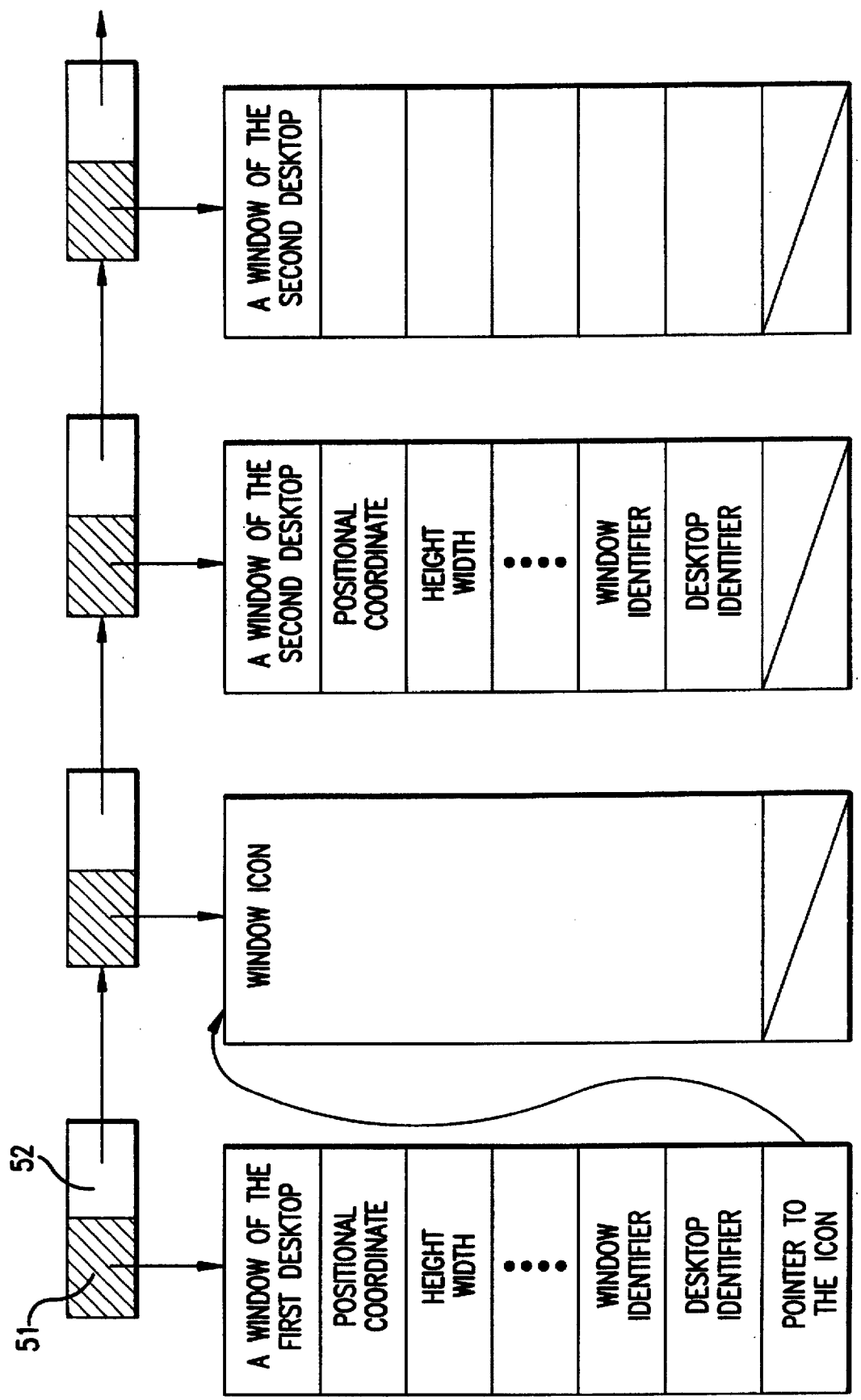
FIG. 5 shows the managed window structures of the embodiment shown in FIG. 1.

FIG. 5 shows the managed window structures of window manager 31. Window manager 31 makes infinite-length lists of every window, and it manages every window.

In FIG. 5, area 51 of oblique lines shows an area of list occupied by the data of a window comprising a frame and a core window, and portion 52 next to it is an area indicating the next data. Infinite-length lists are made by successive addition of the data of area 52 to area 51 for the previous window.

Window information (window data structure) of area 51 occupied by the data of a window comprises: positional information of the window on the screen; size information including height and width of the window; a window identifier; a desktop identifier. If the window is window Wa of the first desktop, the window data structure also comprises a pointer to window icon IWa which corresponds to window Wa and is made instead of window Wa when window Wa is closed.

Figure 6:
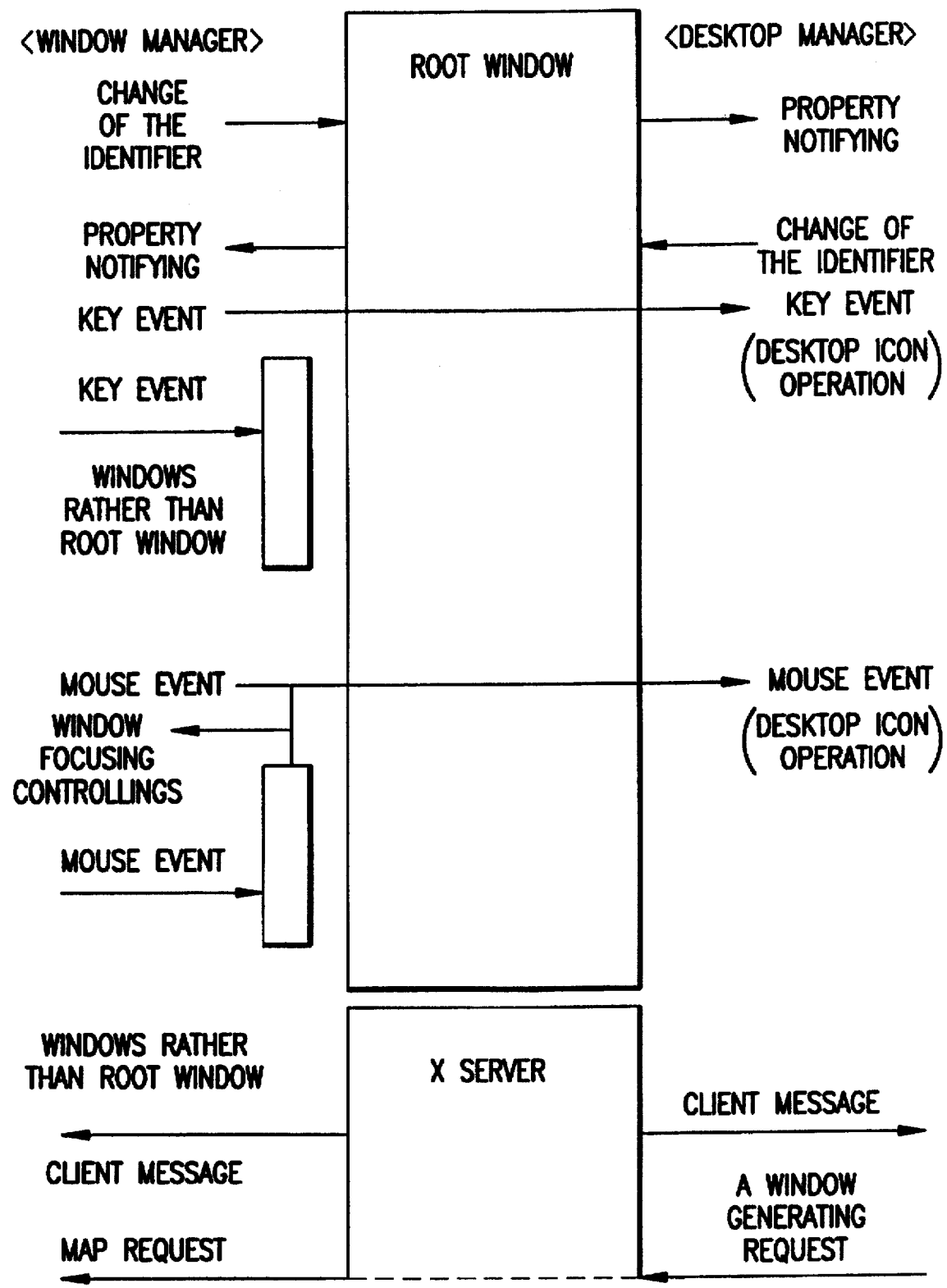
FIG. 6 shows communications between two managers through the root window and an X server.

FIG. 6 shows communications between window manager 31 and desktop manager 32 through the root window or the X server. As described above, in this embodiment, an event caused by an operation applied to root window RW is transferred from window manager 31 which is shown in the left side of root window RW to desktop manager 32 shown in the right side through root window RW. This event is either a key event or a mouse event.

An event transferred to desktop manager 32 side, that is, to the second desktop, is: icon selecting, icon menu displaying, icon moving, icon copying, icon deleting, icon opening (window opening) or the like.

For example, in the cases of a mouse event, icon selecting is realized by indicating by a mouse a desktop icon to be selected and applying a single click to it, and icon opening is realized by indicating by a mouse a desktop icon corresponding to a window to be generated and applying double clicks to it. Other icon controlling such as icon menu displaying, icon moving, icon copying or icon deleting is carried out by selecting an icon to be controlled and inputting by key an item such as menu displaying, (icon) moving, (icon) copying or (icon) deleting.

If one of such operation is applied, the event caused by the operation is transferred from window manager 31 to desktop manager 32 finally as shown in FIG. 6. Desktop icon controlling portion 321 of desktop manager 32 carries out controlling corresponding to such event, for example, showing a selected desktop icon by black/white inversion display. If the event is icon menu displaying, icon moving, icon copying or icon deleting, controlling corresponding to the event type is done.

If the event is icon opening, desktop manager 32 transfers a window generating request to window manager 31 side through X server 30 as shown in FIG. 6. Receiving this window generating request, X server 30 sends a map request (window visualizing request) to window manager 31.

The core window of a generated window is managed by a client application as described above, and processing caused in the window is carried out by the application. The application sends a request for carrying out processing to X server 30, and X server 30 sends back the event (information of processing completion) to the application, which allows application carry out processing.

All the key events and mouse events to windows other than the root window are processed by window manager 31 itself as describe above.

Processing for closing a generated window is now described. As for a window of the first desktop of this embodiment, if the menu button of the frame of a window generated in the first desktop is selected by a mouse, menus for window controlling are displayed, and if "close" of these menus is selected, window manager 31 recognizes that "close" is selected.

Window manager 31 sends an unmap request (window destroying request) to X server 30, and X server 30 destroys the core window, and after that, window manager 31 receives an unmap event (window destroying event).

Receiving this information that X server has completed destroying the core window, window manager 31 carries out destroying the frame of the window, and then it makes a window icon corresponding to the window in the root window.

The processing carried out by desktop manager 32 when generating or destroying a window of the second desktop of this embodiment is now described.

Figure 8:
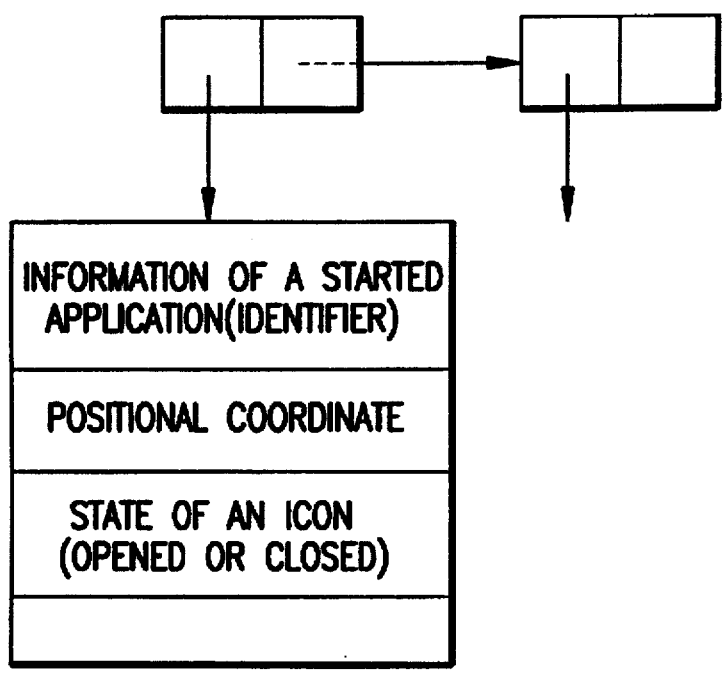
FIG. 8 shows the managed icon structures of the embodiment shown in FIG. 1.

Desktop manager 32, as window manager 31, manages every desktop icon provided in the root window by infinite-length lists as shown in FIG. 8. Here, the information of icon status (icon data structure) include positional coordinates of icons and states of icons, that is, they are opened or closed.

Icon data structure also includes the information showing what is the application carried out in a window corresponding to a certain desktop icon and which also corresponds to an application identifier. Here, an application identifier corresponds to a window identifier individually. A window corresponding to a certain desktop icon is generated when the desktop icon is selected and doubly clicked by a mouse. When an application corresponding to the window is started in accordance with the generating of this window, the application identifier is sent to X server 30. X server 30 then makes a window identifier individually corresponding to the application identifier and sends it to window manager 31. As described above, window manager 31 includes this window identifier in a data structure of the window list, for managing windows.

Figure 7:
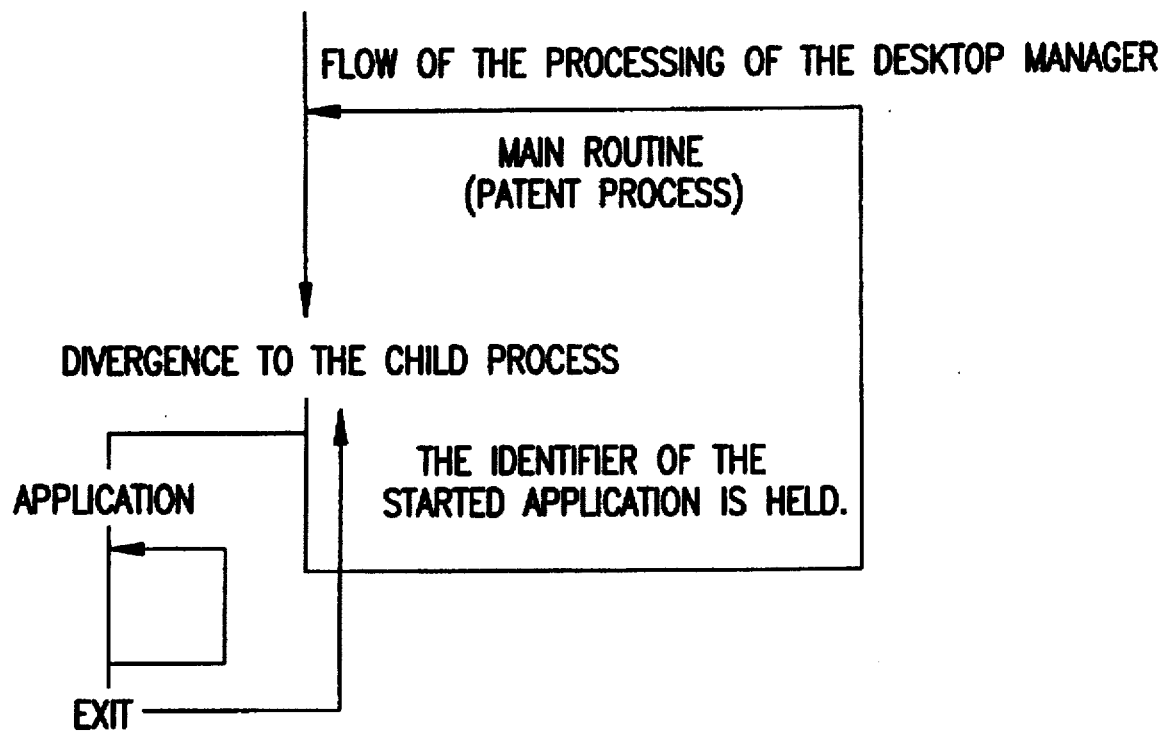
FIG. 7 shows a part of the processing carried out in the embodiment shown in FIG. 1.

FIG. 7 shows the processing carried out by the desktop manager from when a window is generated and a corresponding application is started until when the window is closed and the application is ended.

When a window generating request is caused by applying double clicks to an icon while the main routine of desktop manager 32 is being processed, the window generating request is outputted to window manager 31 and the corresponding window is generated. Here, a child process to carry out the application is made in desktop manager 32 which carries out its main routine as a parent process.

When the child process is made, a process identifier is provided to the child process, and the identifier of the application carried out in the window generated by applying double clicks to the desktop icon is held in the parent process of the application. The data of the icon state included in the icon data structure of the icon lists then becomes "opened", and the application is carried out while the window is opened.

As for a window of the second desktop of this embodiment, buttons such as "close" are displayed in the core window, and if an event closing the window is caused by selecting the "close" button, the application managing the core window carries out processing for closing the window. After closing the window, the application sends a message including the application identifier to desktop manager 32, which is the parent process, through X server 30.

The parent process, that is, desktop manager 32 recognizes which application ended the window closing processing by the application identifier, and as the desktop icon corresponding to the closed window is now known, desktop manager 32 makes the icon state, which is included in the icon data structure, "closed".

As an application identifier corresponds to a window identifier individually, when X server 30 receives from the application a window destroying request which is a message showing that the window is closed, informs window manager 31 that the window identified by the window identifier is closed. Receiving this, window manager 31 carries out processing for destroying the frame of the closed window, and thus, deleting of a window of the second desktop is done.

The processing for receiving an event caused by an operation of a user applied to a desktop is now described. As described above, an operation of a user applied to the desktop is informed as an event, and particularly, mouse events (events caused by mouse operating of users) and key events (events caused by keyboard operating of users) are used as events corresponding to operations of users with respect to desktops.

Figure 9A:
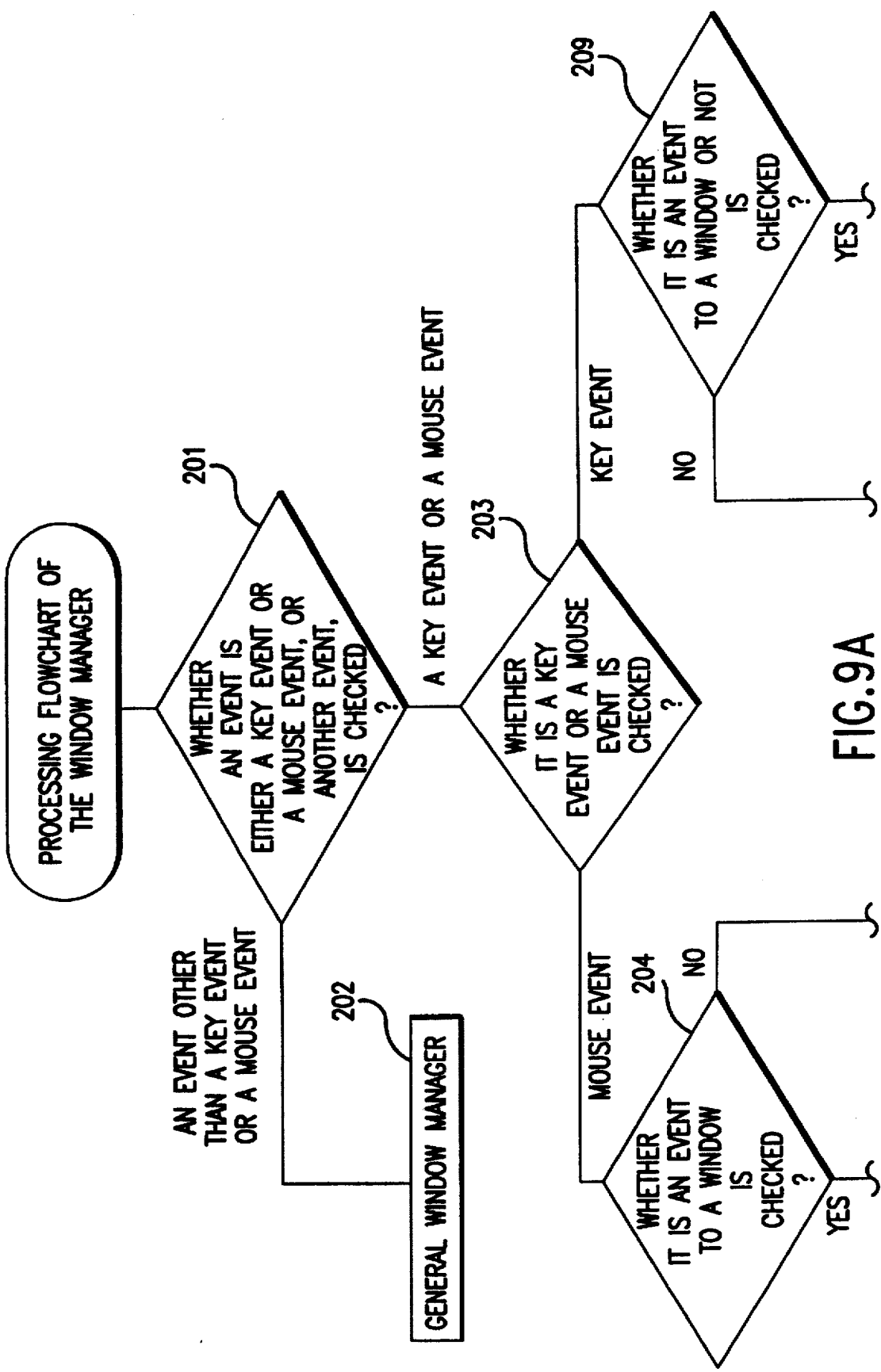
FIG. 9A-B show a flowchart of event processing steps of the embodiment shown in FIG. 1.
Figure 9B:
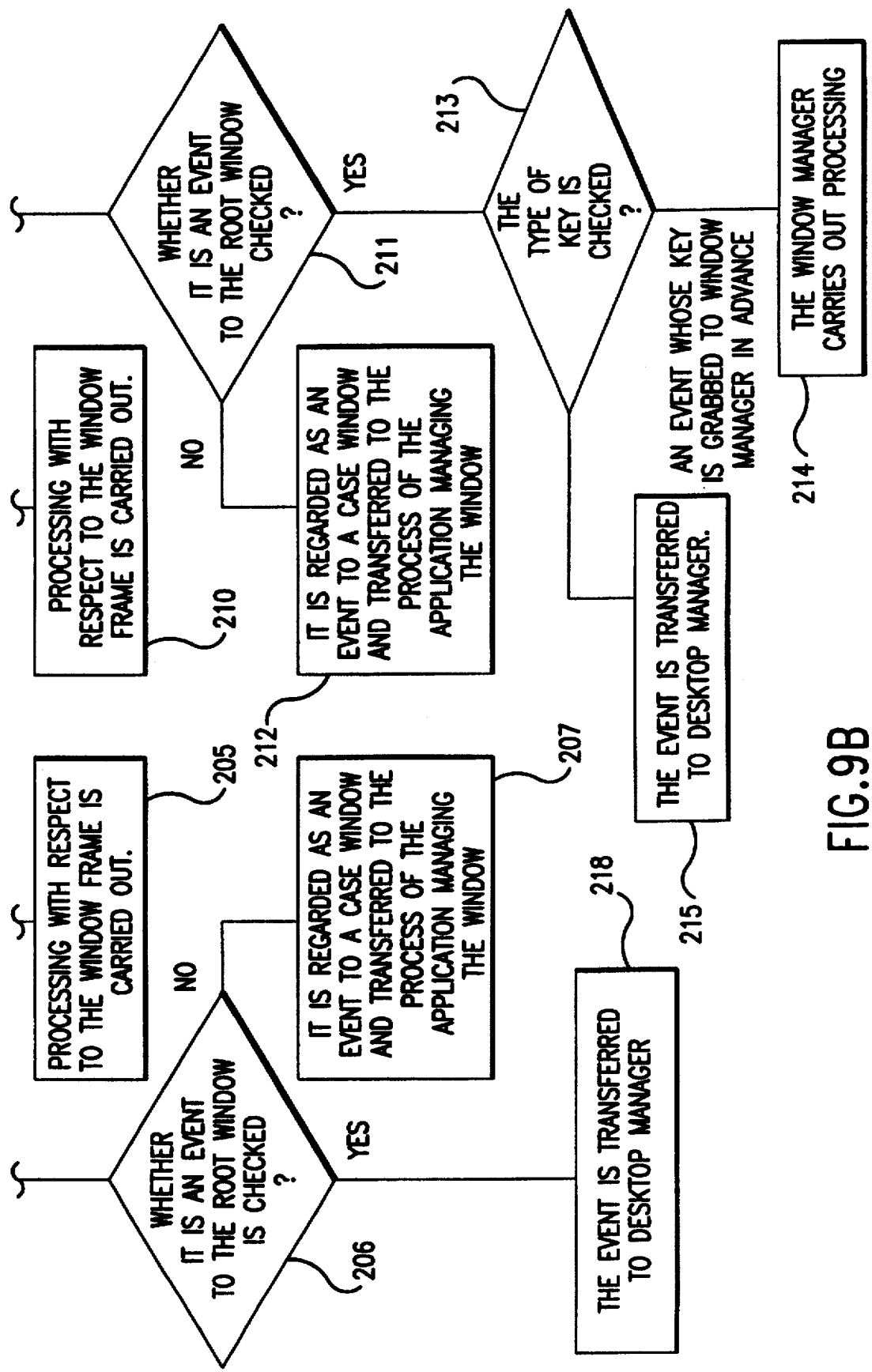

FIG. 9 is a flowchart of the processing carried out after window manager 31 receives an event. When an event is received by window manager 31, it is checked whether the event is either a key event or a mouse event, or another event (step 201). If it is an event other than a key event or a mouse event, processing is carried out in accordance with the general managed window structures (step 202), that is, window controlling is carried out by window manager 31.

If the event is a key event or a mouse event, it is checked whether it is a key event or a mouse event (step 203), and the following processing is carried out in accordance with the result. If the event is a mouse event, it is checked whether it is an event to a window (including the root window)(step 204), and if it is an event to a portion other than windows, that is, to the frame of a window, the processing proceeds to step 205 and processing with respect to the window frame is carried out.

If it is an event to a window, the processing proceeds from step 204 to step 206, and it is checked whether it is an event to the root window. If it is not, it is regarded as an event to a core window and it is transferred to the process of the application wherein a suitable processing for it is carried out. If it is an event to the root window, the processing proceeds to step 208, and the event is transferred to desktop manager 32.

If an event is determined to be a key event in step 203, it is checked whether it is an event to a window or not (step 209). If it is not, it is regarded as an event to a window frame, and processing with respect to the frame is carried out in step 210, which is in charge of window manager 31.

If the key event is determined to be an event to a window, the processing proceeds from step 209 to step 211, and it is checked whether it is an event to the root window or not. If it is not, it is regarded as an event to a core window and it is transferred to the process of the application managing the window (step 212).

If it is an event to the root window, the processing proceeds from step 211 to step 213 and the type of key is checked. If it is an event of a key grabbed to window manager 31 in advance, the processing proceeds to step 214, and window manager 31 carries out the processing. If it is an event of a general key other than keys grabbed to window manager 31 in advance, the processing proceeds to step 215, and the event is transferred to desktop manager 32.

Figure 10B:
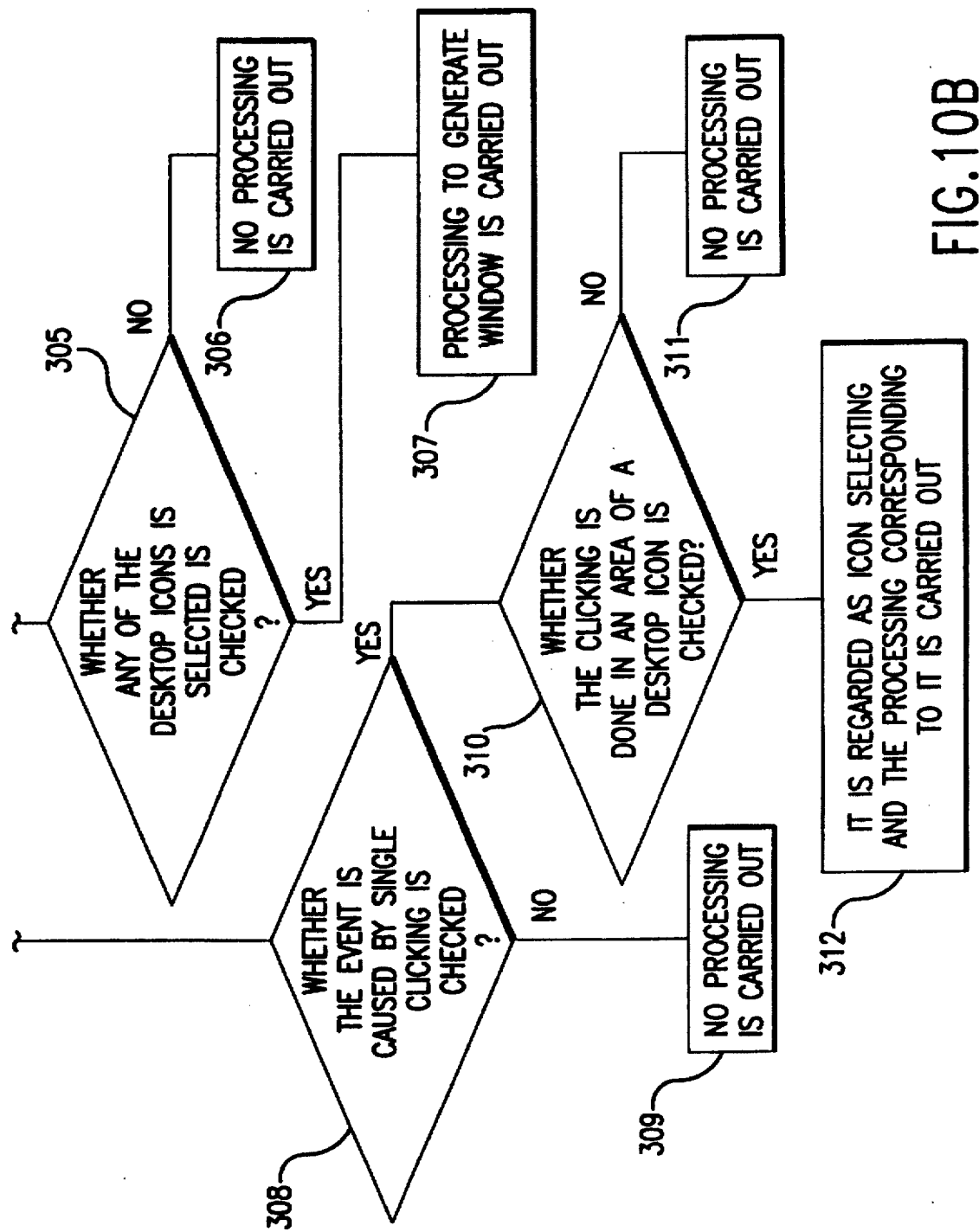
Figure 11:
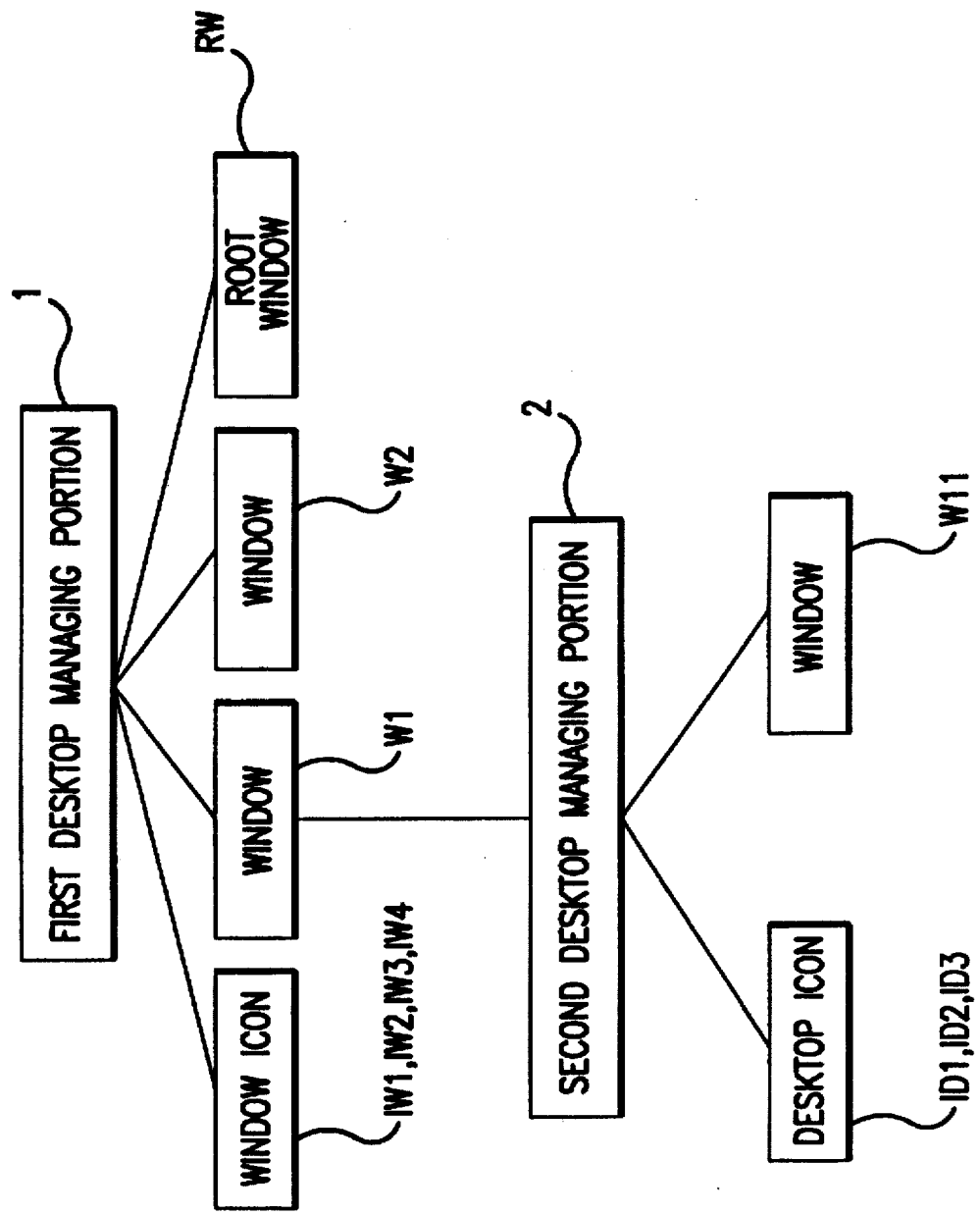
FIG. 11 is a schematic view showing the functions of an example of a conventional data processing device.
Figure 12:
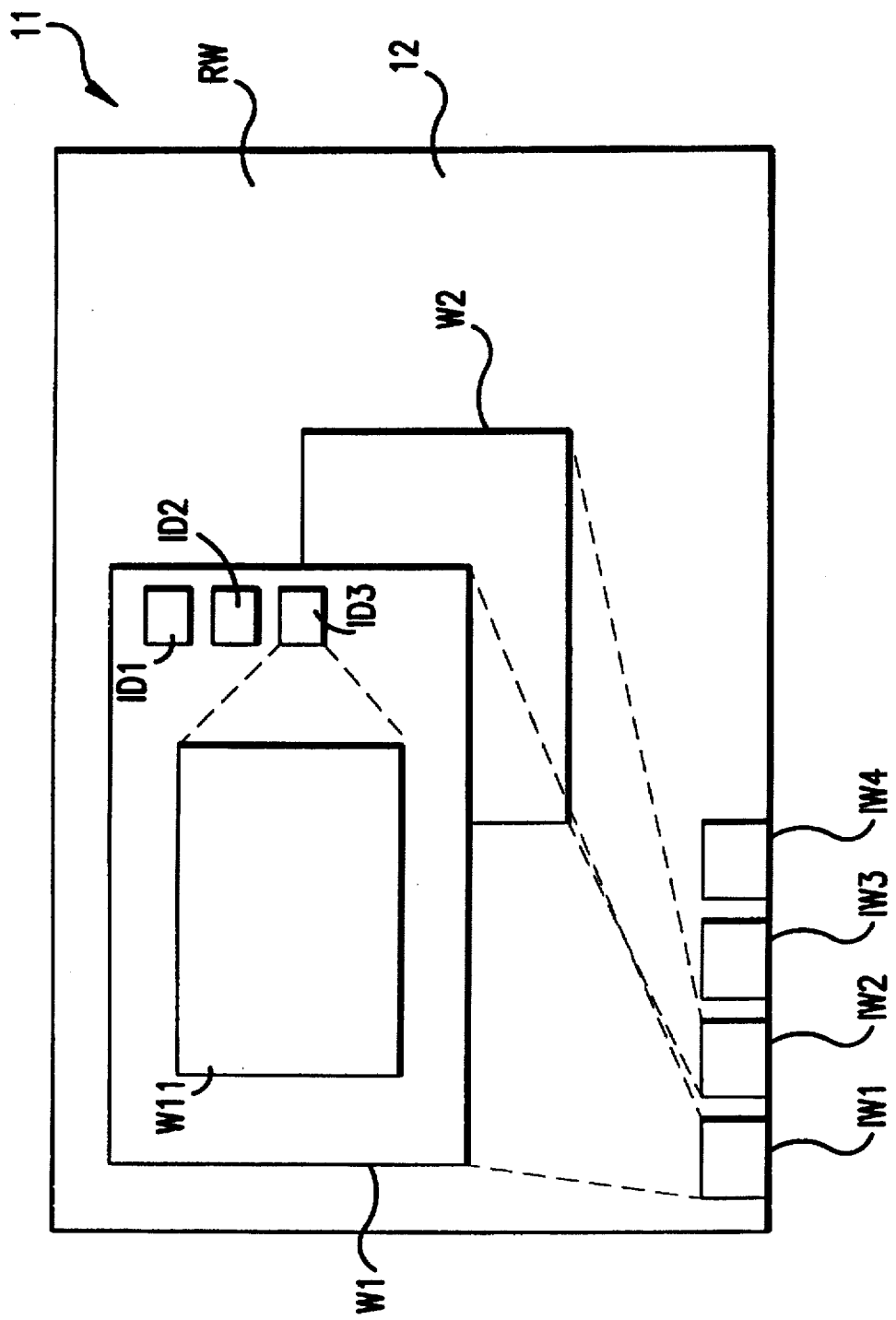
FIG. 12 shows an example of a screen used in an example of a conventional data processing device shown in FIG. 11.

The processing with respect to an event transferred to desktop manager 32 is now described, using FIG. 10 wherein the flowchart of the processing steps carried out by desktop manager 32 is shown.

Here, as a transferred event is either a mouse event or a key event, it is checked whether it is a key event or a mouse event in step 301. If the event is a mouse event, the processing proceeds to step 302 and it is checked whether it is caused not by a click but by button pressing wherein a button is pressed during a time longer than the predetermined time.

If the mouse event is determined to be caused by button pressing, the processing proceeds to step 303, and root menu is displayed. This root menu for producing commands which are effective to every desktop.

In this embodiment, the identifier of the root window is changed to realize the command ending every desktop, that is, the identifier is changed so that the root menu for producing commands which are effective to every desktop is displayed when the button of the mouse is pressed in a portion other than desktop icons. Here, it is desktop manager 32 which displays the root menu.

If a command ending every desktop is selected, desktop manager 32 communicates to window manager 31 to make window manager 31 end the first desktop of this embodiment, in addition to controlling the behavior of every window and icon of the second desktop of this embodiment for making the second desktop ended.

If a mouse event is determined not to be caused by button pressing in step 302, the processing proceeds to step 304 and it is checked whether the mouse event is caused by doubly clicking or not. If it is caused by doubly clicking the processing proceeds to step 305 and it is checked whether any of the desktop icons is selected. If no desktop icon is selected, no processing is carried out (step 306).

If a desktop icon is selected, the processing proceeds from step 305 to step 307, and the processing to generate a window corresponding to the desktop icon is carried out as described above in accordance with the double clicking, that is, a window generating request is outputted to window manager 31.

If the mouse event is determined not to be caused by doubly clicking in step 304, the processing proceeds to step 308 and it is determined whether the event is caused by single clicking or not. If it is determined not to be caused by single clicking in step 308, no processing is carried out (step 309). If the mouse event is determined to be caused by single clicking, the processing proceeds from step 308 to step 310, and it is checked whether the clicking is done in an area of a desktop icon. If it is not, no processing is carried out (step 311), and if it is, it is regarded as icon selecting and the processing corresponding to it, for example, displaying the selected desktop icon on the screen by black/white inversion, is carried out (step 312).

If an event is determined to be a key event in step 301, the processing proceeds to step 313, and it is checked whether any of desktop icons is selected. If a desktop icon is not selected, no processing is carried out (step 314), and if a desktop icon is selected, the processing corresponding to it is found in a conversion table with respect to key inputting which is included in desktop manager 32 in advance and the processing is carried out (step 315).

As described above, if an operation of a user is applied to a window icon, it is processed as event inputting to the first desktop, and generating of a window corresponding to the window icon is carried out. If an operation of a user is applied to a desktop icon, it is regarded as an operation to the second desktop, and the behavior of the window corresponding to the desktop icon is controlled by the communications between desktop manager 32 and window manager 31. Therefore, two types of desktops are provided on a screen.

Thus, with a data processing device according to the present invention, as the user can operate the data processing device without switching the first and the second desktops, he need not care about switching, and extra processing is not caused.

Further, as switching desktops is not necessary, overhead is not caused, and high speed processing is possible, compared with a conventional data processing device wherein a second desktop is made in a window of a first desktop. Yet further, it is also possible to operate two desktops simultaneously.

Embodiment 2

The second embodiment of the present invention is now described. In the second embodiment, desktop icons managed by desktop manager 32 are divided into a plurality of groups and a plurality of desktops whose types are determined in accordance with the desktop icons and the corresponding windows are made. Here, an individual desktop identifier is provided to each icon of each desktop to identify which desktop the group wherein each icon included belongs to. Desktop manager 32 identifies which desktop each of the desktop icons belongs to in accordance with the desktop identifier, and it manages desktop icons.

In this embodiment, if an event to generate a window is caused by applying double clicks to a desktop icon of one of the desktops, desktop manager 32, after receiving it from window manager 31 finally, provides, to a request for generating a corresponding window, the desktop identifier of the desktop to which the operated desktop icon belongs, and desktop manager 32 outputs the window generating request to window manager 31.

In this embodiment, window manager 31 prepares window frames which differ in accordance with desktop identifiers and are common if desktop icons belong to the same desktop, and a window of the desktop to which the operated desktop icon belongs is generated.

Thus, in this embodiment, at least two desktops whose behaviors are determined in accordance with desktop icons and the corresponding windows can be made, and with a desktop whose behavior is determined in accordance with window icons and the corresponding windows, at least three desktops can be made.

In the above described first and second embodiments, event managing portion 312 is included in window manager 31, and it is obvious that the same effects as obtained in these embodiments can be obtained even if the event managing portion is provided, separated from window manager 31.

As described above, with the present invention, at least two operation environments can be made on a screen by dividing the processing managing the operation environments into two processing, that is, the processing managing windows, which makes a first operation environment and the processing managing the root window other than windows. The second operation environment allows communications between the root window managing processing and the window managing processing.

Further, with the present invention, as switching of a plurality of operation environments is not necessary, extra processing is not caused, and as there is no overhead caused when switching, high speed processing can be realized. Unlike data processing device wherein one operation environment is made in a window of another operation environment, there is no overhead such as controlling of an operation environment after processing a window, high speed processing is also possible in this respect.

What is claimed is:

1. A data processing device having multi-window functions wherein a plurality of windows are displayed on a screen and processing is carried out in each of said windows, comprising:

first processing means that manages a desktop operation environment comprising windows generated on said screen;

second processing means that manages a non-desktop operation environment of said screen other than said windows;

event managing means that determines whether an event caused by an operation applied to said screen is for one of a first operation environment and a second operation environment, in accordance with whether the operation is applied with respect to one of said windows of the desktop and the non-desktop area of said screen other than said windows, and said second processing means including window generating request outputting means that outputs to said first processing means a request for generating a window of said second operation environment for event processing when an event is determined to be for said second operation environment by said event managing means, and said first processing means including window controlling means which not only generates and controls a window of said first operation environment for event processing when an event is determined to be for said first operation environment by said event managing means but also generates a window of said second operation environment in accordance with a request for generating a window of said second operation environment from said second processing means.

2. A data processing device having multi-window functions wherein a plurality of windows are displayed on a screen and processing is carried out in each of said windows, comprising:

a first processor for managing a desktop operation environment on said screen comprising windows generated on said screen;

a second processor for managing a non-desktop area of said screen other than said windows; and an event manager for determining whether an event caused by an operation applied to said screen is for one of a first operation environment and a second operation environment, in accordance with whether the operation is applied with respect to one of said windows of the desktop operation environment and the non-desktop area of said screen other than said windows, and said second processor outputs to said first processor a request for generating a window of said second operation environment for event processing when an event is determined to be for said second operation environment by said event manager, and said first processor not only generates and controls a window of said first operation environment for event processing when an event is determined to be for said first operation environment by said event manager but also generates a window of said second operation environment in accordance with a request for generating a window of said second operation environment from said second processor.

3. An apparatus for processing data using a desktop environment comprising a plurality of windows on a screen, and a non-desktop environment comprising an area other than said windows on the screen, comprising:

means for managing the desktop environment on the screen using a first processor;

means for managing the non-desktop environment on the screen using a second processor;

means for determining whether an event caused by an operation applied to said screen is for the desktop environment or the non-desktop environment;

means for outputting a request for generating a window from the second processor to the first processor when the event is determined to be for the non-desktop environment;

means for generating and controlling a window of the desktop environment using the first processor when the event is determined to be for the desktop environment, and also for generating a window of the non-desktop environment in accordance with the request for generating a window from the second processor.

* * * * *